US012191609B2

(12) United States Patent
Martin

(10) Patent No.: US 12,191,609 B2
(45) Date of Patent: Jan. 7, 2025

(54) ELECTRICAL CONTACT POSITION ASSURANCE FOR ELECTRICAL CONNECTOR SYSTEM

(71) Applicant: TE Connectivity Services GmbH, Schaffhausen (CH)

(72) Inventor: Galen M. Martin, Mechanicsburg, PA (US)

(73) Assignee: TE Connectivity Solutions GmbH (CH)

( * ) Notice: Subject to any disclaimer, the term of this patent is extended or adjusted under 35 U.S.C. 154(b) by 404 days.

(21) Appl. No.: 17/676,391

(22) Filed: Feb. 21, 2022

(65) Prior Publication Data

US 2023/0268696 A1 Aug. 24, 2023

(51) Int. Cl.
*H01R 13/70* (2006.01)
*H01R 13/629* (2006.01)

(52) U.S. Cl.
CPC ..... *H01R 13/701* (2013.01); *H01R 13/62911* (2013.01)

(58) Field of Classification Search
None
See application file for complete search history.

(56) References Cited

U.S. PATENT DOCUMENTS 9,048,045 B2 * 6/2015 Henmi .................. H01H 21/02
9,171,685 B2 * 10/2015 Henmi .................. H01H 21/22

* cited by examiner

*Primary Examiner* — Ross N Gushi

(57) ABSTRACT

A plug connector includes a plug housing having an outer wall forming a cavity. A portion of the plug connector is configured to be plugged into a header chamber of a header connector to mate plug contacts with corresponding header contacts. The plug connector includes an actuator coupled to the plug housing movable between an open position and a closed position. The actuator is configured to engage the header connector to provide mechanical mating assist of the plug connector with the header connector as the actuator is moved from the open position to the closed position. An eCPA assembly includes a shorting terminal operably coupled to the actuator and movable by the actuator between a mated position and an unmated position configured to be coupled to a first fixed terminal and a second fixed terminal to forms a position assurance circuit.

24 Claims, 13 Drawing Sheets

ELECTRICAL CONTACT POSITION ASSURANCE FOR ELECTRICAL CONNECTOR SYSTEM

BACKGROUND OF THE INVENTION

The subject matter herein relates generally to electrical connector systems.

Electrical connector systems use electrical connectors to electrically connect various components within a system, such as a vehicle. For example, a plug connector may be mated with a header connector. Each connector holds contacts that are mated when the plug connector is coupled to the header connector. If the connectors are only partially mated, the electrical connectors may work intermittently or not at all. Additionally, with power connectors, partial connection of the connectors could lead to damage, such as due to short circuiting or electrical arcing. It is desirable in some systems to provide assurance that the connectors are fully mated and that the connectors remain fully mated during use of the system.

BRIEF DESCRIPTION OF THE INVENTION

In one embodiment, a plug connector is provided and includes a plug housing having an outer wall extending between a front and a rear of the plug housing. The outer wall forms a cavity. The plug housing is configured to be coupled to a header connector. The plug housing includes contact channels. A portion of the plug connector is configured to be plugged into a header chamber of the header connector. The plug connector includes plug contacts received in corresponding contact channels. The plug contacts are configured to be mated with corresponding header contacts of the header connector. The plug connector includes an actuator coupled to the plug housing. The actuator is movable relative to the plug housing between an open position and a closed position. The actuator is configured to engage the header connector to provide mechanical mating assist of the plug connector with the header connector as the actuator is moved from the open position to the closed position. The plug connector includes an electrical connector position assurance (eCPA) assembly including a shorting terminal operably coupled to the actuator and movable by the actuator between a mated position and an unmated position. The shorting terminal includes a first interface configured to be coupled to a first fixed terminal in the mated position and a second interface configured to be coupled to a second fixed terminal in the mated position. The shorting terminal forms a position assurance circuit in the mated position when the first and second interfaces are coupled to the first and second fixed terminals.

In another embodiment, a plug connector is provided and includes a plug housing having an outer wall extending between a front and a rear of the plug housing. The outer wall forms a cavity. The plug housing is configured to be coupled to a header connector. The plug housing includes contact channels. A portion of the plug connector is configured to be plugged into a header chamber of the header connector. The plug connector includes plug contacts received in corresponding contact channels. The plug contacts are configured to be mated with corresponding header contacts of the header connector. The plug connector includes an actuator coupled to the plug housing. The actuator is movable relative to the plug housing between an open position and a closed position. The actuator is configured to engage the header connector to provide mechanical mating assist of the plug connector with the header connector as the actuator is moved from the open position to the closed position. The plug connector includes an electrical connector position assurance (eCPA) assembly including a seal and a shorting terminal. The shorting terminal is operably coupled to the actuator and movable by the actuator between a mated position and an unmated position. The shorting terminal includes a first interface configured to be coupled to a first fixed terminal in the mated position and a second interface configured to be coupled to a second fixed terminal in the mated position. The shorting terminal forms a position assurance circuit when the first and second interfaces are coupled to the first and second fixed terminals. The eCPA seal provides sealing around the shorting terminal.

In a further embodiment, an electrical connector system is provided and includes a header connector including a header housing and header contacts held by the header housing. The header housing has a base and a shroud extending from the base. The shroud surrounds a shroud chamber. The header contacts are coupled to the base and extend into the shroud chamber. The electrical connector system includes a plug connector including a plug housing holding plug contacts. The plug housing has an outer wall forming a cavity. The outer wall is coupled to the shroud of the header connector. A portion of the plug connector is plugged into the shroud chamber of the header connector. The plug housing includes contact channels receiving corresponding plug contacts. The plug contacts are mated with the corresponding header contacts of the header connector. The plug connector includes an actuator coupled to the plug housing and movable relative to the plug housing between an open position and a closed position. The actuator engages the header connector to provide mechanical mating assist of the plug connector with the header connector as the actuator is moved from the open position to the closed position. The electrical connector system includes an electrical connector position assurance (eCPA) assembly operably coupled to the header connector and the plug connector. The eCPA includes a first fixed terminal coupled to the header housing and a second fixed terminal coupled to the header housing. The eCPA includes a shorting terminal operably coupled to the actuator and movable by the actuator between a mated position and an unmated position. The shorting terminal includes a first interface configured to be coupled to a first fixed terminal in the mated position and a second interface configured to be coupled to a second fixed terminal in the mated position. The shorting terminal forms a position assurance circuit in the mated position when the first and second interfaces are coupled to the first and second fixed terminals.

DETAILED DESCRIPTION OF THE INVENTION

Figure 1:
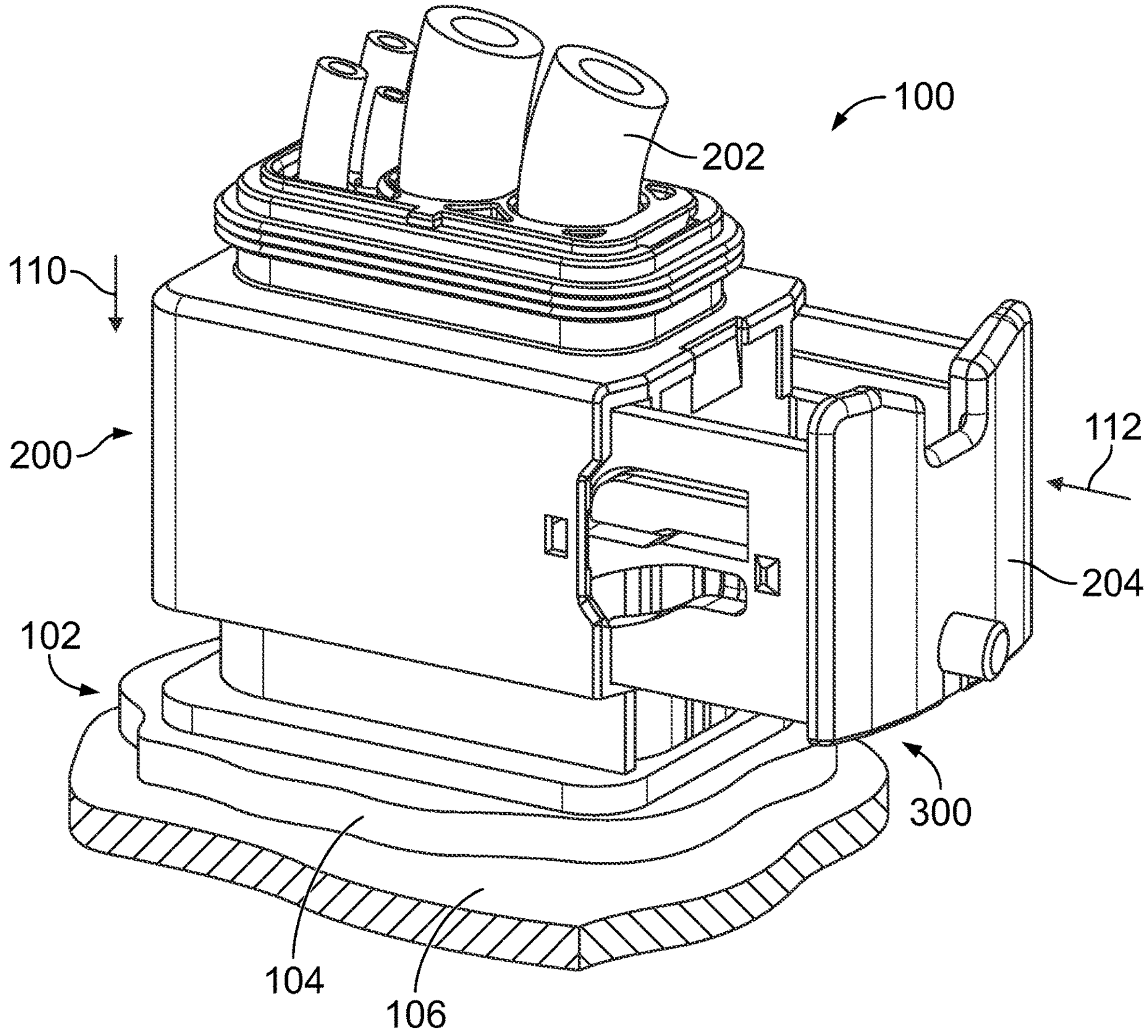
FIG. 1 is a perspective view of an electrical connector system in accordance with an exemplary embodiment in a partially mated state.
Figure 2:
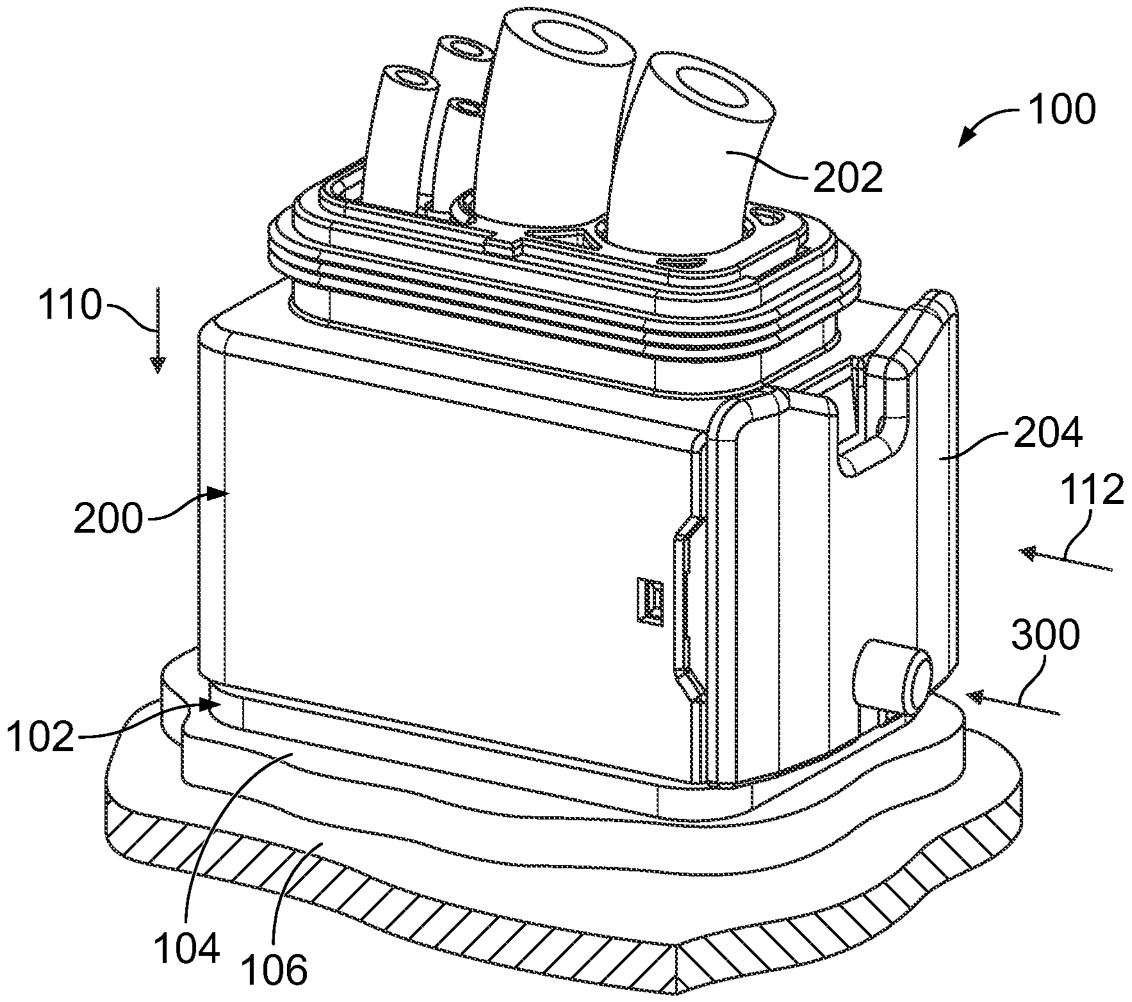
FIG. 2 is a perspective view of an electrical connector system in accordance with an exemplary embodiment in a fully mated state.

FIG. 1 is a perspective view of an electrical connector system 100 in accordance with an exemplary embodiment in a partially mated state. FIG. 2 is a perspective view of an electrical connector system 100 in accordance with an exemplary embodiment in a fully mated state. The electrical connector system 100 includes a header connector 102 and a plug connector 200 removably coupled to the header connector 102. FIG. 1 illustrates the plug connector 200 partially mated to the header connector 102. FIG. 2 illustrates the plug connector 200 fully mated with the header connector 102. In an exemplary embodiment, the electrical connector system 100 includes an electrical connector position assurance (eCPA) assembly 300 operable to electrically assure or guarantee that the connectors are fully mated and properly latched together. In an exemplary embodiment, the eCPA assembly 300 is a sealed assembly providing a sealed interface between the connectors. For example, the electrical components of the eCPA assembly 300 are contained within a sealed environment.

The electrical connector system 100 may be used within a harsh environment, such as within a vehicle. The electrical connector system 100 may be exposed to moisture, dirt, debris, vibration, shock, and the like. In an exemplary embodiment, the header connector 102 is mounted to the vehicle, such as to a chassis or frame of the vehicle. The header connector 102 may be mounted to a component of the vehicle, such as the battery module or other electrical component of the vehicle. For example, the header connector 102 is mechanically mounted to a housing 104 or other structure. The header connector 102 may be electrically connected to an electrical component of the vehicle, such as the battery module. For example, the header connector 102 may be electrically connected to a circuit board 106 located within the housing 104. The header connector 102 may transmit data and/or power to or from the circuit board 106. In alternative embodiments, the header connector 102 may be a cable connector rather than a board connector. For example, the header connector 102 may be provided at ends of cables (not shown).

The plug connector 200 is removably coupled to the header connector 102. The plug connector 200 is configured to be mated to the header connector 102 in a mating direction 110 (for example, a vertical direction). In an exemplary embodiment, the plug connector 200 is a cable connector. For example, the plug connector 200 is terminated to ends of cables 202. The cables 202 extend from the plug connector 200 and are routed to another component or area of the vehicle.

In an exemplary embodiment, the plug connector 200 includes an actuator 204 for mating assist with the header connector 102. The actuator 204 engages the header connector 102 to provide mechanical mating assist of the plug connector 200 with the header connector 102. The actuator 204 moves between an open position (FIG. 1) and a closed position (FIG. 2). The actuator 204 forces the plug connector 200 in the mating direction 110 as the actuator 204 moves from the open position to the closed position. The plug connector 200 is fully mated with the header connector 102 in the closed position. For example, the plug connector 200 is partially mated to the header connector 102, such as to the partially mated position shown in FIG. 1, prior to actuation of the actuator 204. Once in the partially mated position, the operator moves the actuator 204 from the open position to the closed position. The action of closing the actuator moves the plug connector 200 along the final mating path to the fully mated position. In an exemplary embodiment, the actuator 204 is a slide. For example, the actuator 204 is moved in a linear actuation direction 112. In the illustrated embodiment, the actuation direction 112 is perpendicular to the mating direction 110 (for example, horizontal direction). The sideways sliding motion of the actuator causes downward mating motion of the plug connector 200. For example, cam elements or other actuating elements transfer the horizontal sliding movement of the actuator 204 into vertical mating movement of the plug connector 200.

Other types of actuators may be used in alternative embodiments, such as a lever actuator. The lever actuator may be moved in a rotating direction to move the plug connector 200 to the fully mated position.

In an exemplary embodiment, the actuator 204 operates as a locking feature. For example, the actuator 204 prevents unmating of the plug connector 200 from the header connector 102. When the actuator 204 is in the closed position, the plug connector 200 is unable to separate from the header connector 102 and remains in the locked, mated position. The plug connector 200 is only able to be unmated from the header connector 102 after the actuator 204 is moved from the closed position to the open position. In an exemplary embodiment, the action of moving the actuator 204 from the closed position to the open position partially unmates the plug connector 200 from the header connector 102. For example, opening the actuator 204 forces the plug connector 200 to move in an upward direction.

In an exemplary embodiment, the eCPA assembly 300 is operably coupled to the actuator 204. For example, a portion of the eCPA assembly 300 may be held by the actuator 204 and movable with the actuator 204. The eCPA assembly 300 creates a position assurance circuit that is only activated when the actuator 204 is in the closed position. For example, the position assurance circuit may be a normally open circuit and the position assurance circuit is closed or made when the actuator 204 is closed. In other embodiments, the position assurance circuit may be a normally closed circuit and the position assurance circuit is open or short circuited when the actuator 204 is closed. As such, the operation of the electrical connector system 100 may be controlled by the eCPA assembly 300. For example, power or signals may not be transmitted through the electrical connector system 100 unless and until the position assurance circuit is closed (or opened depending on the particular arrangement). As such, normal operation of the electrical connector system 100 only occurs when the plug connector 200 is fully mated with the header connector 102.

Figure 3:
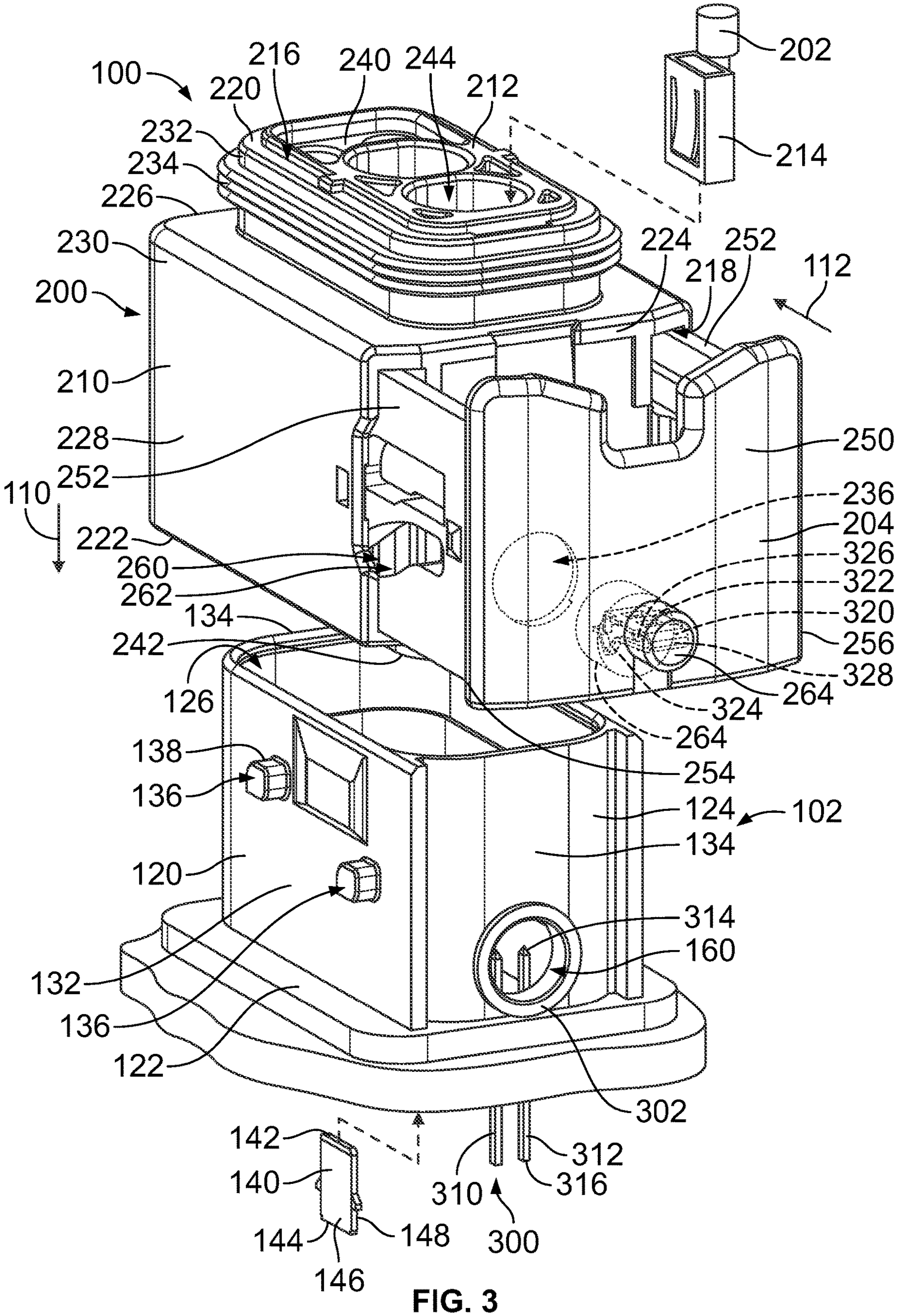
FIG. 3 is an exploded view of the electrical connector system in accordance with an exemplary embodiment showing the plug connector poised for mating with the header connector.

FIG. 3 is an exploded view of the electrical connector system 100 in accordance with an exemplary embodiment showing the plug connector 200 poised for mating with the header connector 102. Some components of the eCPA assembly 300 are shown in phantom.

The header connector 102 includes a header housing 120 holding header contacts 140. The header housing 120 includes a base 122 at a bottom of the header connector 102 and a shroud 124 extending from the base 122 to a top of the header connector 102. The shroud 124 surrounds a shroud chamber 126. The header contacts 140 extend into the shroud chamber 126. The shroud chamber 126 is open at the top to receive a portion of the plug connector 200. In an exemplary embodiment, the shroud 124 includes side walls 130 and end walls 132 between the side walls 130, such as at a front and a rear of the header connector 102. Optionally, the side walls 130 may be longer than the end walls 132. In various embodiments, the corners between the side walls 130 and the end walls 132 are curved.

In an exemplary embodiment, the shroud 124 includes guide features 134 to guide mating with the plug connector 200. The guide features 134 may orient the plug connector 200 relative to the header connector 102. In the illustrated embodiment, the guide features 134 are tabs or wings extending from one or more of the walls of the shroud 124. For example, the guide features 134 may be provided at the front of the header connector 102, such as at the corners where the side walls 130 meet the end wall 132 at the front. The guide features 134 may be provided at other locations in alternative embodiments. Other types of guide features may be used in alternative embodiments. The guide features may provide keyed mating with the plug connector 200.

In an exemplary embodiment, the shroud 124 includes mating features 136 used for mating the plug connector 200 with the header connector 102. The mating features 136 may be used to latchably couple the actuator 204 to the header connector 102. In various embodiments, the mating features 136 are used to securely lock the plug connector 200 to the header connector 102. In the illustrated embodiment, the mating features 136 include protrusions or posts 138 extending from the exterior of the side walls 130. Other types of mating features may be used in alternative embodiments. In the illustrated embodiment, the shroud 124 includes a pair of the posts 138 extending from each side wall 130. The posts 138 are offset relative to each other, such as being vertically offset and horizontally offset. Other orientations are possible in alternative embodiments. In the illustrated embodiment, the posts 138 are generally rectangular in shape, such as including a plurality of flat surfaces. However, the posts 138 may have other shapes in alternative embodiments, such as being circular.

FIG. 3 illustrates one of the header contacts 140 located below the header housing 120 and poised for loading into the header housing 120. In an exemplary embodiment, the header contacts 140 are loaded into the header housing 120 from below the base 122. The header contacts 140 may be stitched into the base 122 to couple the header contacts 140 to the header housing 120. The header contacts 140 may be retained in the base 122 by an interference fit, such as using tabs or barbs extending from sides of the header contacts 140 to hold the header contacts 140 in the header housing 120. In an exemplary embodiment, each header contact 140 extends between a mating end 142 and a terminating end 144. The mating end 142 extends into the shroud chamber 126 and is configured to be mated with the plug connector 200. The terminating end 144 may extend below the base 122 for termination to another component, such as the circuit board 106 (shown in FIG. 1). In the illustrated embodiment, the header contact 140 is a blade type contact having generally planar sides 146, 148 that define mating interfaces for mating with corresponding plug contacts of the plug connector 200. Other types of contacts may be used in alternative embodiments, such as pins, sockets, spring beam contacts, tuning fork contacts, or other types of contacts. The header contacts 140 may be signal contacts, power contacts, the ground contacts, or other types of contacts.

In an exemplary embodiment, the header housing 120 includes an opening 160 through the shroud 124. In the illustrated embodiment, the opening 160 is provided in the end wall 132 at the front. Other locations are possible in alternative embodiments. The opening 160 is provided for the eCPA assembly 300 operation. For example, the opening 160 allows components of the eCPA assembly 300 to pass from the exterior of the shroud 124 into the interior of the shroud chamber 126. In an exemplary embodiment, some of the components of the eCPA assembly 300 are located within the shroud chamber 126 and other components of the eCPA assembly 300 are located exterior of the shroud 124 and pass through the opening 160 during operation. In an exemplary embodiment, the eCPA assembly 300 includes a seal 302 at the opening 160. The seal 302 provides an environmental seal to seal off the shroud chamber 126 from the external environment, such as from moisture and debris.

The plug connector 200 is configured to be mated with the header connector 102 from above. The plug connector 200 includes a plug housing 210 having a plug insert 212 holding plug contacts 214. The actuator 204 is coupled to the plug housing 210. The plug contacts 214 are held in the plug housing 210, such as by the plug insert 212. The cables 202 are coupled to the plug contacts 214 and extend from the plug housing 210 to a remote component. In an exemplary embodiment, the plug housing 210 includes an outer wall 211 defining a cavity 216. The plug insert 212 is received in the cavity 216 of the plug housing 210. The actuator 204 is received in an actuator channel 218 in the plug housing 210. The actuator 204 is movable relative to the plug housing 210, such as to move between the open position and the closed position. For example, the actuator 204 slides into and out of the actuator channel 218. Alternatively, the actuator 204 may be provided at the exterior of the plug housing 210.

The plug housing 210 extends between a top 220 and a bottom 222. The plug housing 210 includes a front 224 and a rear 226. The plug housing 210 includes sides 228 extending between the front 224 and the rear 226. In the illustrated embodiment, the actuator channels 218 are open at the front 224 to receive the actuator 204. The actuator 204 extend forward of the plug housing 210 and is movable in the actuation direction 112 (for example, forward/rearward). In an exemplary embodiment, the cavity 216 is open at the bottom 222 to receive the plug insert 212. Optionally, the cavity 216 may be open at the top 220 such that a portion of the plug insert 212 extends from the top 220. The cables 202 are configured to extend from the top 220. In an exemplary embodiment, the plug housing 210 includes a main body 230 and a neck 232 at the top 220. The main body 230 may be generally box shaped. The neck 232 may have a reduced size relative to the main body 230. The neck 232 may be coupled to another component, such as a ferrule of the cable assembly (not shown). In an exemplary embodiment, a seal 234 is provided along the neck 232. The seal 234 may be sealed to the ferrule or other component. The seal 234 provides environmental ceiling for the cavity 216, such as to prevent moisture or debris from entering the cavity 216. Additionally, or alternatively, a seal (not shown) may be provided between the plug housing 210 and the plug insert 212.

In an exemplary embodiment, the plug insert 212 is separate and discrete from the plug housing 210 and coupled to the plug housing 210. However, in alternative embodiments, the plug insert 212 may be integral with the outer wall 211 of the plug housing 210, such as being co-molded with the plug housing 210, rather than being a separate and discrete component that is inserted into the cavity 216. In other alternative embodiments, the plug connector 200 may be provided without the plug insert 212. Rather, the plug housing 210 may hold the plug contacts 214 without having any plug insert 212.

The plug insert 212 extends between a top 240 and a bottom 242. The plug insert 212 includes one or more contact channels 244 extending therethrough. The plug housing 210 may additionally or alternatively include the contact channels 244. The contact channels 244 receive corresponding plug contacts 214. The cables 202 may extend into the contact channels 244 for termination to the plug contacts 214. Optionally, the cables 202 may be sealed within the contact channels 244.

In an exemplary embodiment, the actuator 204 includes a lever 250 at a front of the actuator 204 and arms 252 extending rearward from the lever 250 at opposite sides 254, 256 of the actuator 204. The arms 252 are received in the actuator channels 218. In the illustrated embodiment, the arms 252 are vertical walls extending parallel to each other. The arms 252 are configured to slide into and slide out of the plug housing 210 as the actuator 204 is closed and opened. In an exemplary embodiment, each arm 252 includes at least one cam slot 260. In the illustrated embodiment, each arm 252 includes two of the cam slots 260. The cam slots 260 are configured to receive corresponding mating features 136 of the header connector 102. The cam slots 260 form tracks to guide mating with the header connector 102. In the illustrated embodiment, the cam slots 260 form non-linear tracks. For example, the cam slots 260 follow a non-horizontal path. In an exemplary embodiment, each cam slot 260 includes a ramp portion 262, which is oriented nonparallel to the mating direction 110 and nonparallel to the actuation direction 112. The cam slots 260 are configured to transfer horizontal movement of the actuator 204 in the actuation direction 112 into vertical movement of the plug connector 200 in the mating direction 110. During mating with the header connector 102.

During mating, the plug connector 200 is aligned with the header connector 102. The plug insert 212 is configured to be plugged into the shroud chamber 126. The plug housing 210 is configured to surround the shroud 124. For example, the shroud 124 may be plugged into the cavity 216 during mating. The mating features 136 are received in the cavity 216 and configured to interface with the actuator 204. For example, the mating features 136 may be aligned with and received within the cam slots 260 of the actuator 204. The plug connector 200 is partially mated with the header connector 102 to align the cam slots 260 with the mating features 136. The actuator 204 is then operated (for example, moved from the open position to the closed position) to fully mate the plug connector 200 with the header connector 102. When the actuator 204 is moved from the open position to the closed position, the mating features 136 slide within the tracks defined by the cam slots 260 to provide mechanical mating assistants of the plug connector 200 with the header connector 102. For example, as the mating features 136 ride along the ramp portion 262 of the cam slot 260, the horizontal movement of the actuator 204 is transferred to vertical movement of the plug housing 210.

During mating, the plug contacts 214 are configured to be mated with the header contacts 140. In an exemplary embodiment, the plug contacts 214 are receptacle contacts configured to receive the header contacts. However, other types of contacts may be used in alternative embodiments, such as pins, sockets, blade contacts, spring beam contacts, tuning fork contacts, and the like. The plug contacts 214 may be power contacts, signal contacts, ground contacts, and the like.

The eCPA assembly 300 is operably coupled to the plug connector 200 and the header connector 102. For example, some of the components of the eCPA assembly 300 may be coupled to the plug connector 200 and some of the components of the eCPA assembly 300 may be coupled to the header connector 102. Various components of the eCPA assembly 300 may be electrically connected together during mating of the plug connector 200 with the header connector 102 to form a position assurance circuit that provides an electrical guarantee that the plug connector 200 is fully mated with the header connector 102, such as to allow operation and use of the electrical connector system 100.

In an exemplary embodiment, the eCPA assembly 300 includes a first fixed terminal 310, a second fixed terminal 312, and a shorting terminal 320 (shown in phantom) configured to be electrically connected to the first and second fixed terminals 310, 312. In an exemplary embodiment, the shorting terminal 320 is a stamped and formed terminal. The shorting terminal 320 includes a main body 322 and mating arms 324, 326 extending from the main body 322. The mating arms 324, 326 include mating interfaces configured to engage the first and second fixed terminals 310, 312. The mating arms 324, 326 may be deflectable. The mating arms 324, 326 may be compressible, such as to be spring biased against the fixed terminals 310, 312 to maintain electrical contact with the fixed terminals 310, 312. Optionally, the main body 322 may include a spring portion 328 that is flexible and configured to be flexed or deflected when the mating arms 324, 326 engage the fixed terminals 310, 312, such as to induce spring pressure of the mating arms 324, 326 against the fixed terminals 310, 312 to maintain electrical contact with the fixed terminals 310, 312. For example, the main body 322 may be folded over at the spring portion 328 such that the shorting terminal 320 is generally U-shaped with the mating arms 324, 326 extending generally parallel to the main body 322, either above or below the main body 322. The shorting terminal 320 may have other shapes or features in alternative embodiments.

In the illustrated embodiment, the first and second fixed terminals 310, 312 are coupled to the header housing 120 of the header connector 102. For example, the first and second fixed terminals 310, 312 may be coupled to the base 122. In an exemplary embodiment, the first and second fixed terminals 310, 312 extend into the shroud chamber 126 and are thus interior of the shroud 124. However, in alternative embodiments, the first and second fixed terminals 310, 312 may be located at the exterior of the shroud 124. Each fixed terminal 310, 312 includes a mating end 314 and a terminating end 316. The terminating end 316 may be terminated to a component, such as a wire or the circuit board 106. The mating end 314 is configured to be mated with the shorting terminal 320.

In an exemplary embodiment, the shorting terminal 320 is coupled to the actuator 204 and is movable with the actuator 204. The shorting terminal 320 is configured to be electrically connected to the first and second fixed terminals 310, 312 when the actuator 204 is moved to the closed position. For example, only when the actuator 204 is in the closed position, and thus the plug connector 200 is fully mated with the header connector 102, does the shorting terminal 320 electrically connect to the first and second fixed terminals 310, 312. The distal ends of the mating arms 324, 326 are configured to engage and couple to the fixed terminals 310, 312, respectively. The position assurance circuit is closed when the shorting terminal 320 is electrically connected to the first and second fixed terminals 310, 312 (for example, when the plug connector 200 is fully mated with the header connector 102).

In the illustrated embodiment, the shorting terminal 320 is coupled to the lever 250 of the actuator 204. The shorting terminal 320 is located at a rear side of the lever 250 and faces the plug housing 210. In an exemplary embodiment, the lever 250 includes a protrusion 264 extending rearward of the lever 250. The protrusion 264 has a pocket 266 that receives the shorting terminal 320. The protrusion 264 is aligned with an opening 236 (shown in phantom) in the front 224 of the plug housing 210. The protrusion 264 is configured to be loaded into the opening 236 when the actuator 204 is moved to the closed position. The opening 236 is configured to be aligned with the opening 160 in the header housing 120. The protrusion 264 is configured to be loaded into the opening 160 in the header housing 120 when the actuator 204 is moved to the closed position.

Figure 4:
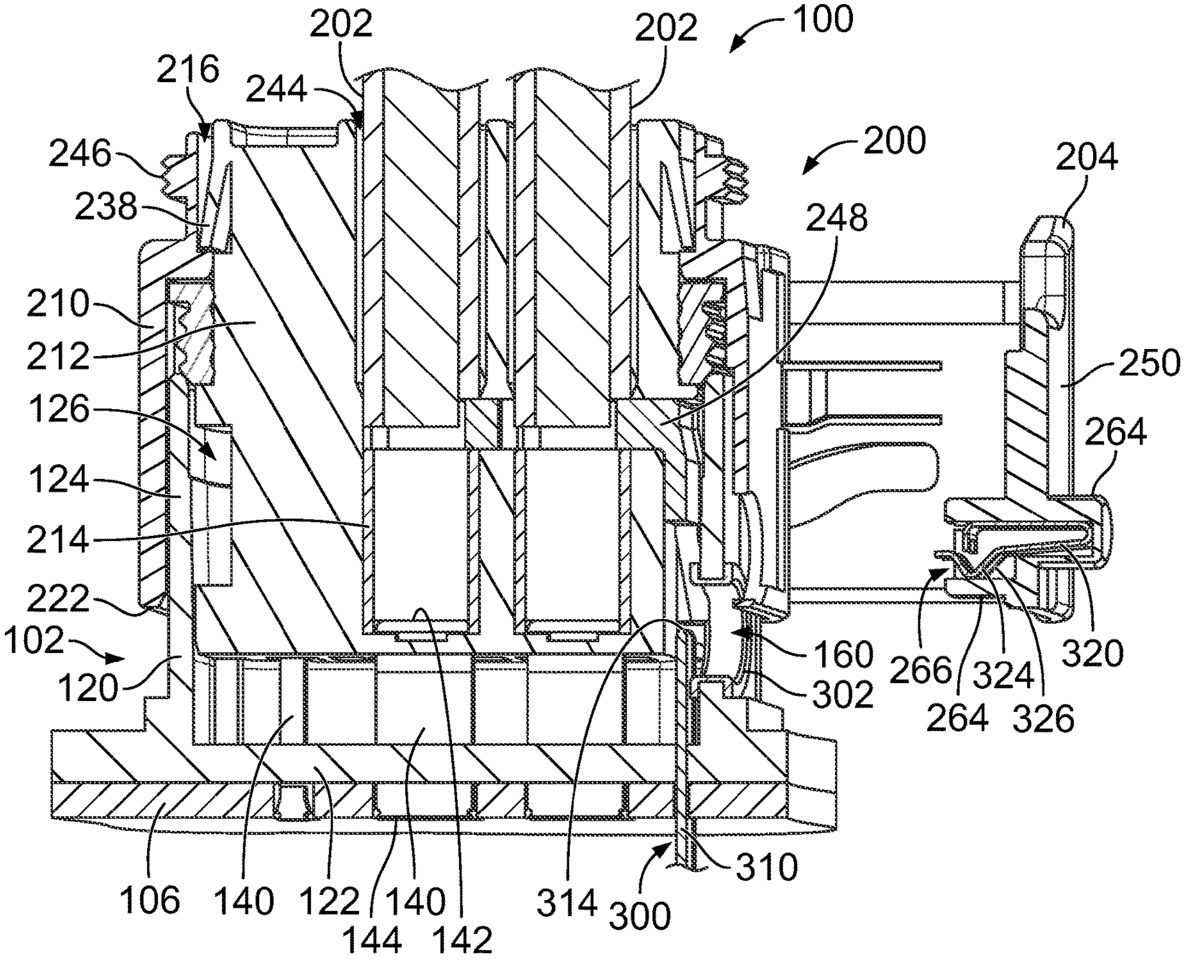
FIG. 4 is a cross-sectional view of the electrical connector assembly in accordance with an exemplary embodiment showing the plug connector partially mated with the header connector 102.

FIG. 4 is a cross-sectional view of the electrical connector assembly 100 in accordance with an exemplary embodiment showing the plug connector 200 partially mated with the header connector 102. The actuator 204 is shown in the open position. The eCPA assembly 300 is in an open state (for example, the position assurance circuit is open).

When assembled, the plug insert 212 is located within the cavity 216 of the plug housing 210. For example, the plug insert 212 may be loaded into the cavity 216 through the bottom 222. In an exemplary embodiment, the plug insert 212 includes a latch 238 to secure the plug insert 212 in the plug housing 210. In an exemplary embodiment, a seal 246 is coupled to the plug insert 212 and/or the plug housing 210. The seal 246 is configured to be sealed against the plug insert 212 and/or the plug housing 210. The seal 246 may be sealingly coupled to the shroud 124 of the header housing 120. For example, the seal 246 may be sealed against the shroud 124 of the header housing 120. In an exemplary embodiment, the plug insert 212 includes a primary lock 248 used to secure the plug contacts 214 in the contact channels 244. Other types of locking features may be used in alternative embodiments to secure the plug contacts 214 in the contact channels 244. The cables 202 are terminated to the plug contacts 214 and extend from the plug insert 212.

When assembled, the header contacts 140 are coupled to the header housing 120. The mating ends 142 of the header contact 140 extend into the shroud chamber 126. The header contact 140 pass through the base 122 and are secured to the header housing 120 at the base 122. Optionally, the terminating ends 144 may extend below the base 122 for electrical connection to wires or the circuit board 106 (shown in FIG. 1). In an exemplary embodiment, the fixed terminals 310, 312 are coupled to the base 122 of the header housing 120. The mating ends 314 of the fixed terminals 310, 312 are located in the shroud chamber 126. The mating ends 314 of the fixed terminals 310, 312 are aligned with the opening 160, such as for mating with the shorting terminal 320.

The shorting terminal 320 is coupled to the lever 250 of the actuator 204. The shorting terminal 320 is movable with the actuator 204, such as from the open position to the closed position. In the illustrated embodiment, the shorting terminal 320 is received in the pocket 266 of the protrusion 264. Optionally, the protrusion 264 may extend from the front and the rear of the lever 250. In an exemplary embodiment, the mating arms 324, 326 may extend rearward from the protrusion 264, such as to interface with the fixed terminals 310, 312.

During mating, the plug connector 200 is aligned with the header connector 102. The plug insert 212 is loaded into the shroud chamber 126. The plug housing 210 surrounds the exterior of the shroud 124. During mating, the seal 246 is configured to be coupled to the shroud 124, such as an interior surface of the shroud 124 to provide a sealed interface between the plug connector 200 and the header connector 102. The seal 302 of the eCPA assembly 300 is provided at the opening 160 to provide a sealed environment for the eCPA assembly 300. In the illustrated embodiment, the seal 302 is mounted to the shroud 124 at the opening 160. However, the seal 302 may be mounted to the plug housing 210 or the protrusion 264 in alternative embodiments. The seal 302 is used to provide an environmental seal for the shroud chamber 126. The seal 302 may be sealingly coupled to the shroud 124 and/or the plug housing 210 and/or the actuator 204. For example, the seal 302 engages the interior surface of the plug housing 210 and is configured to engage the protrusion 264 when the actuator 204 is closed.

Figure 5:
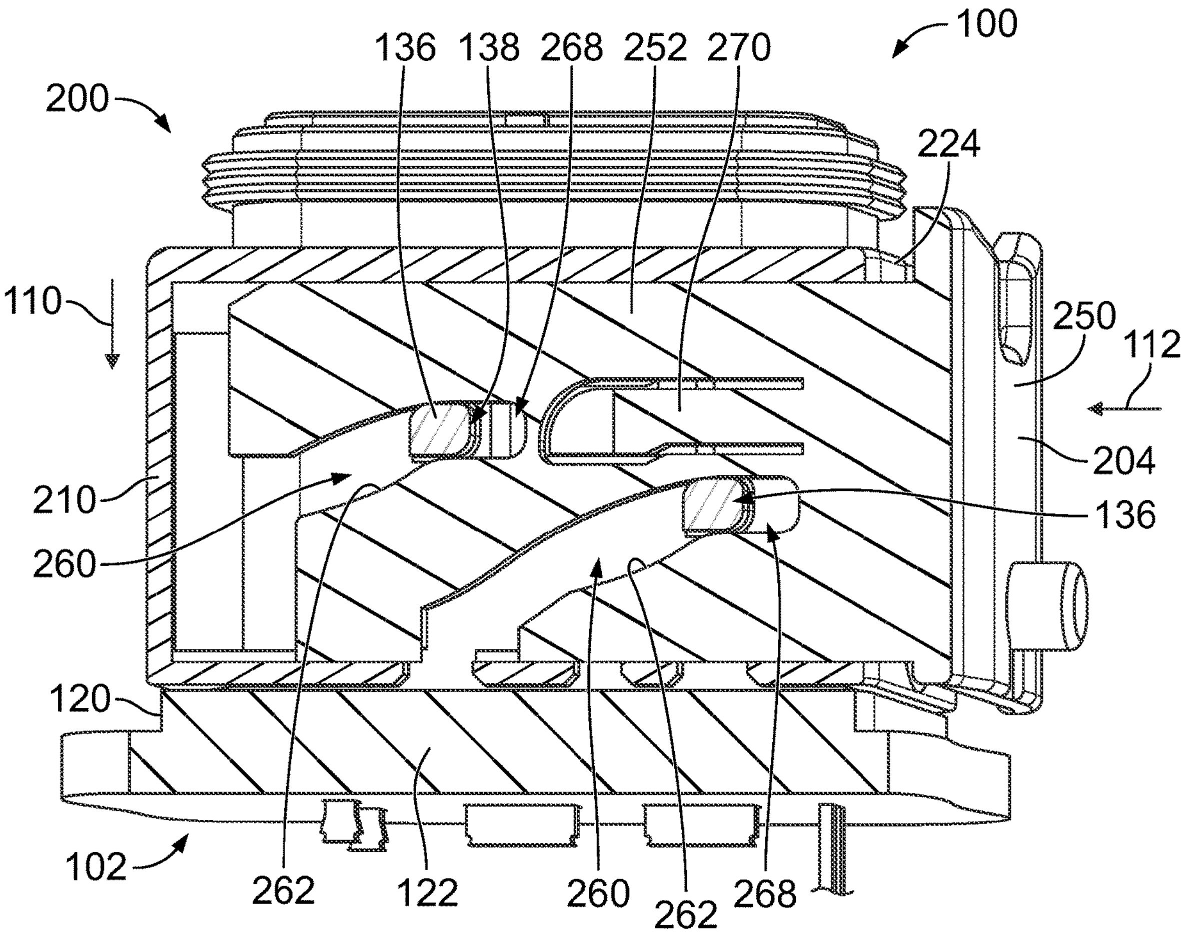
FIG. 5 is a cross-sectional view of the electrical connector system in accordance with an exemplary embodiment showing the plug connector mated with the header connector 102.

FIG. 5 is a cross-sectional view of the electrical connector system 100 in accordance with an exemplary embodiment showing the plug connector 200 mated with the header connector 102. FIG. 5 illustrates the actuator 204 interacting with the mating features 136. The posts 138 are received in the cam slots 260. As the actuator 204 is pushed inward to the closed position, the posts 138 ride along the ramp portions 262 of the cam slots 260 to press the plug connector 200 downward in the mating direction 110. The horizontal closing of the actuator 204 in the actuation direction 112 causes downward movement of the plug connector 200 in the mating direction 110. The plug connector 200 may be moved in the mating direction 110 until the plug housing 210 bottoms out against the base 122 of the header housing 120.

In an exemplary embodiment, the cam slots 260 includes overtravel portions 268 at the ends of the cam slots 260. The overtravel portions 268 extend in directions generally parallel to the actuation direction 112, such as horizontally. When the posts 138 are in the overtravel portions 268, the actuator 204 is able to move in the actuation direction 112 without any movement of the plug connector 200 in the mating direction 110. The plug connector 200 is fully mated with the header connector 102 when the posts 138 are in the overtravel portions 268. The actuator 204 is moved to the fully closed position, such as where the lever 250 of the actuator 204 is pressed against the front 224 of the plug housing 210. In an exemplary embodiment, the actuator 204 includes latches 270 along the arms 252. The latches 270 are configured to be latchably coupled to the plug housing 210 and/or the shroud 124 to retain the actuator 204 in the fully closed position, and thus retain the plug connector 200 in the fully mated position. For example, when the latches 270 are latched, the actuator 204 is unable to move to the open position. The arms 252 interact with the posts 138 and prevent unmating of the plug connector 200 from the header connector 102 until the actuator 204 is opened.

Figure 6:
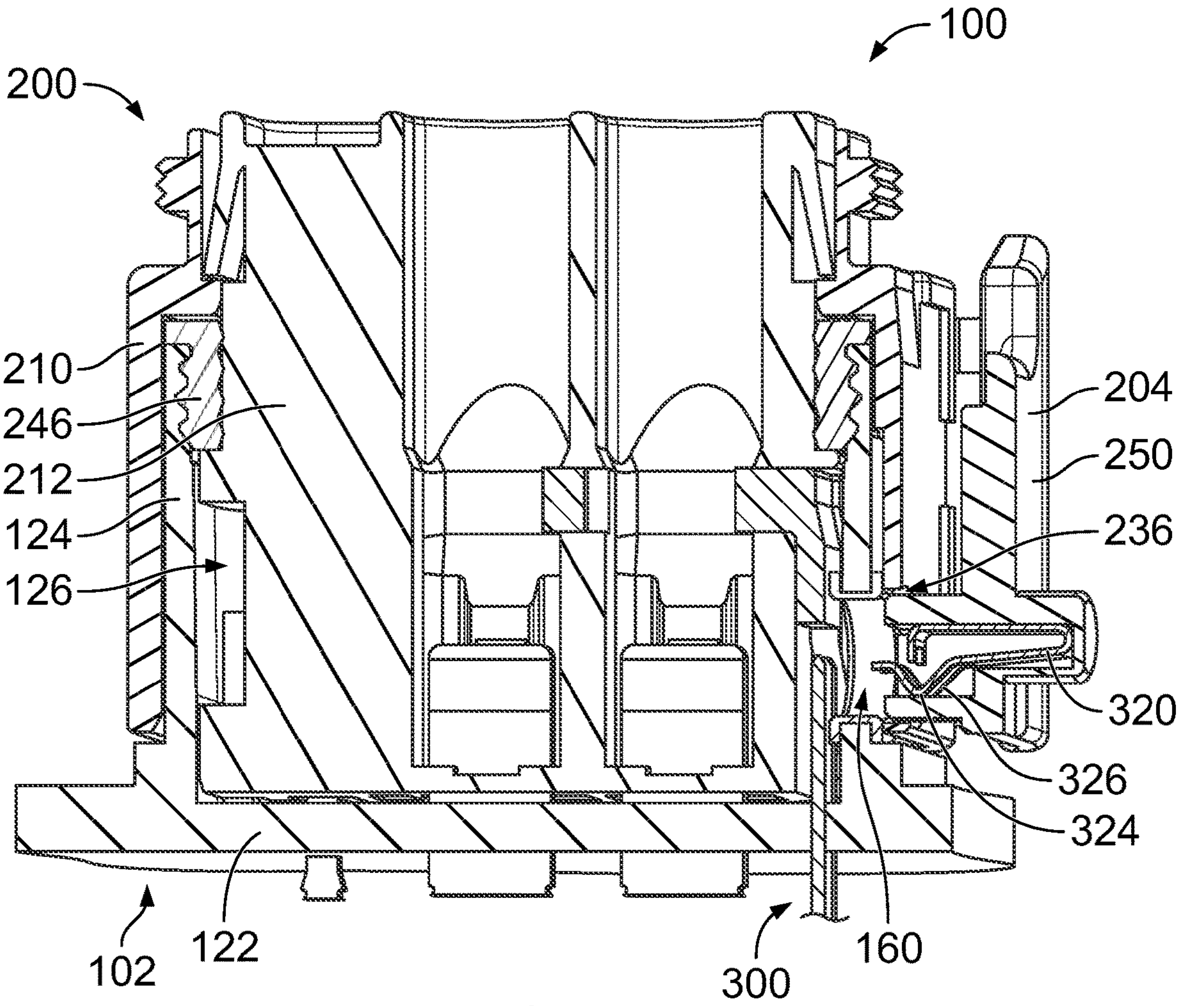
FIG. 6 is a cross sectional view of the electrical connector system in accordance with an exemplary embodiment showing the plug connector mated with the header connector 102.

FIG. 6 is a cross sectional view of the electrical connector system 100 in accordance with an exemplary embodiment showing the plug connector 200 mated with the header connector 102. The plug connector 200 is fully mated with the header connector 102 (for example, cannot be moved downward any further). The actuator 204 is shown in a partially actuated position. For example, the actuator 204 has been partially closed, such as to the point where the posts 138 are at the transition between the ramp portions 262 and the overtravel portions 268 (shown in FIG. 5). The eCPA assembly 300 is in an open state (for example, the position assurance circuit is open).

When fully mated, the plug insert 212 is seated within the shroud chamber 126, such as against the base 122. The plug housing 210 may be seated against the base 122. When fully mated, the shroud 124 is sealing coupled to the seal 246. The seal 246 provides a sealing interface against the plug housing 210, the plug insert 212, and the shroud 124 to seal off the shroud chamber 126. When fully mated, the opening 236 in the plug housing 210 is aligned with the opening 160 in the shroud 124. The protrusion 264 extends rearward from the lever 250 and is aligned with the openings 236, 160. As such, the shorting terminal 320 is aligned with the openings 236, 160. Further closing of the actuator 204 loads the protrusion 264 and the shorting terminal 320 into the openings 236, 160 to interface with the mating arms 324, 326 with the shorting terminal 320.

Figure 7:
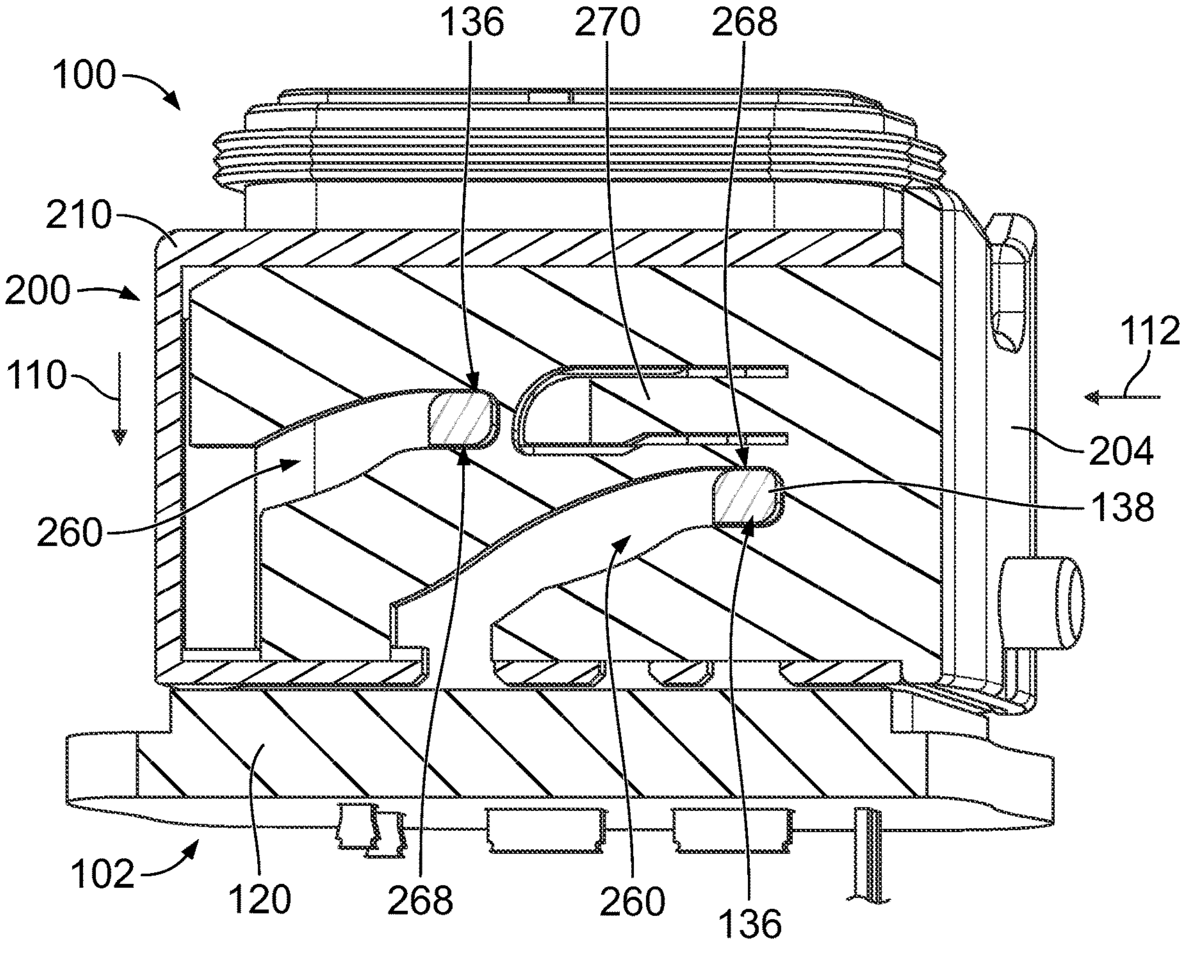
FIG. 7 is a cross-sectional view of the electrical connector system in accordance with an exemplary embodiment showing the plug connector mated with the header connector and showing the actuator in a closed position.

FIG. 7 is a cross-sectional view of the electrical connector system 100 in accordance with an exemplary embodiment showing the plug connector 200 mated with the header connector 102 and showing the actuator 204 in a closed position. FIG. 7 illustrates the actuator 204 interacting with the mating features 136. The posts 138 are received in the overtravel portions 268 of the cam slots 260. As the posts 138 move in the overtravel portions 268, the actuator 204 is able to move inward to the closed position without moving the plug housing 210 relative to the header housing 120. The horizontal closing of the actuator 204 in the actuation direction 112 does not cause any downward movement of the plug connector 200 in the mating direction 110. The latches 270 are configured to be latchably coupled to the plug housing 210 and/or the shroud 124 to retain the actuator 204 in the fully closed position, and thus retain the plug connector 200 in the fully mated position.

Figure 8:
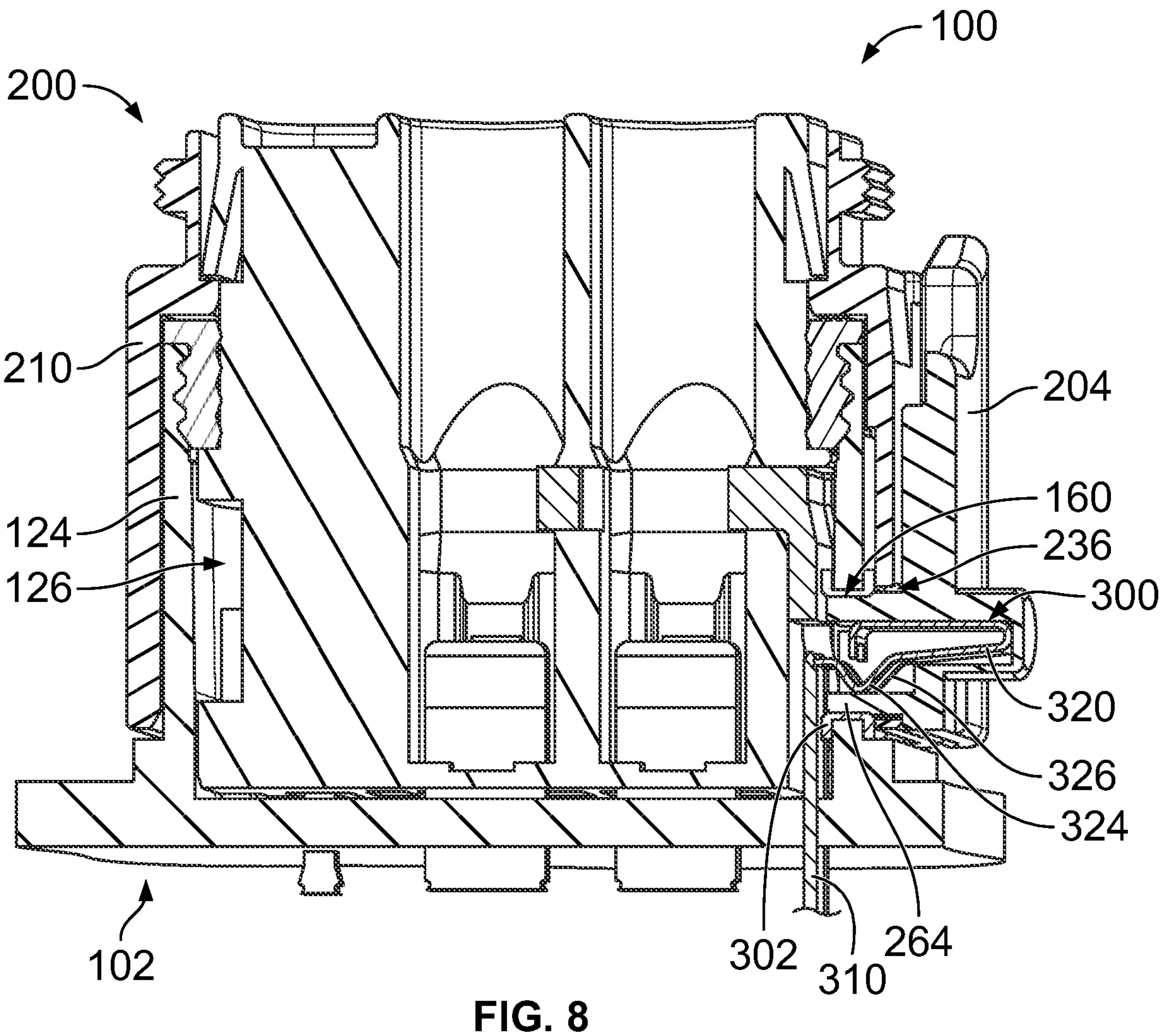
FIG. 8 is a cross sectional view of the electrical connector system in accordance with an exemplary embodiment showing the plug connector fully mated with the header connector and showing the actuator in the closed position.

FIG. 8 is a cross sectional view of the electrical connector system 100 in accordance with an exemplary embodiment showing the plug connector 200 fully mated with the header connector 102 and showing the actuator 204 in the closed position. The eCPA assembly 300 is in a closed state (for example, the position assurance circuit is closed). The mating arms 324, 326 are both electrically connected t of the fixed terminals 310, 312 to complete or close the position assurance circuit. The eCPA assembly 300 guarantees that the plug connector 200 is fully mated with the header connector 102 because the position assurance circuit is only closed after the connectors are fully mated.

When the actuator 204 is closed, the protrusion 264 is loaded through the opening 236 in the plug housing 210 and loaded through the opening 160 in the shroud 124. The shorting terminal 320 is loaded through the openings 236, 160 to mate with the fixed terminals 310, 312. In an exemplary embodiment, when the protrusion 264 is loaded through the opening 160, the seal 302 is sealing coupled to the protrusion 264. The seal 302 seals off the shroud chamber 126 from the external environment. As such, the electrical components of the eCPA assembly 300 (for example, the fixed terminals 310, 312 and the shorting terminal 320 are sealed from the external environment.

Figure 9:
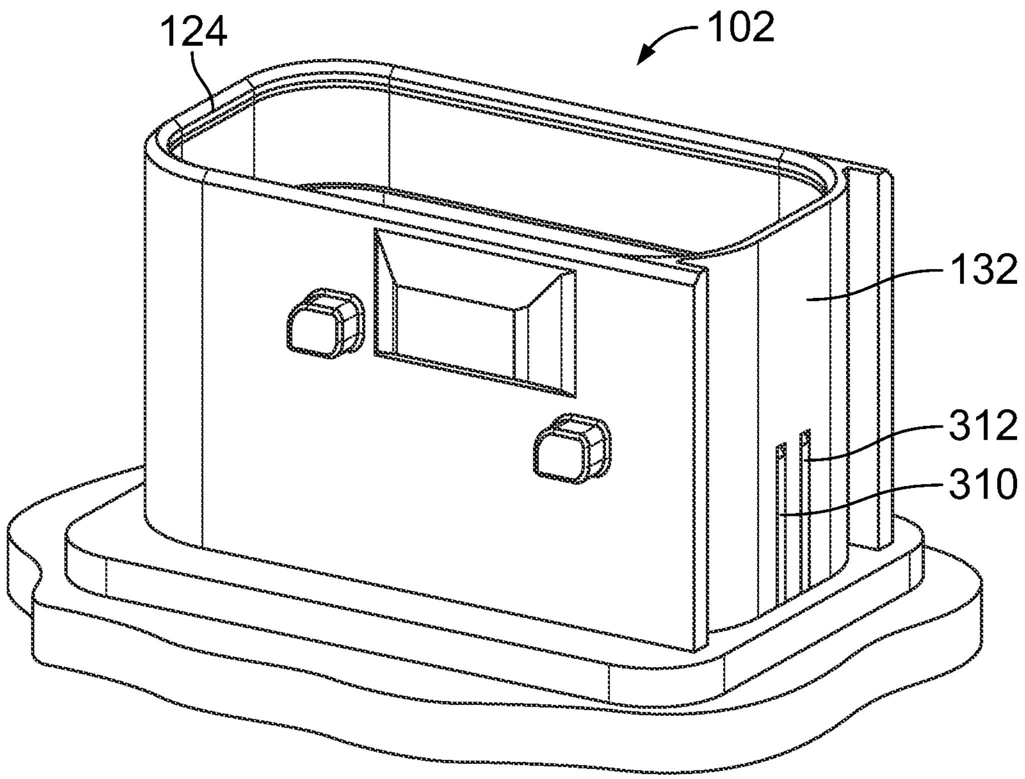
FIG. 9 is a perspective view of the header connector in accordance with an exemplary embodiment.

FIG. 9 is a perspective view of the header connector 102 in accordance with an exemplary embodiment. FIG. 9 illustrates the first and second fixed terminals 310, 312 extending along the exterior of the shroud 124 as opposed be located within the interior of the shroud chamber 126 as shown in FIG. 3. In the illustrated embodiment, the fixed terminals 310, 312 extend along the end wall 132 at the front of the shroud 124.

Figure 10:
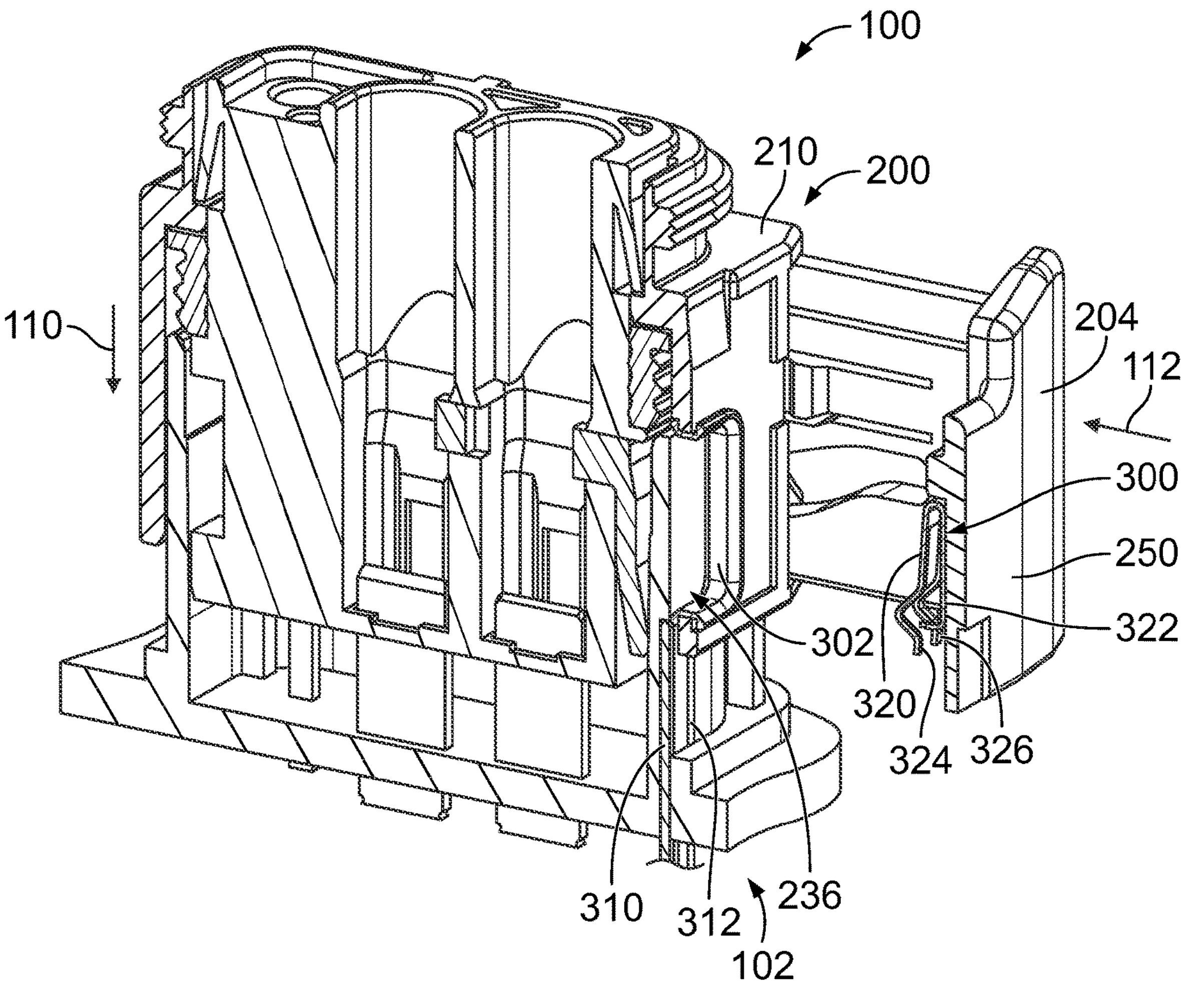
FIG. 10 is a cross-sectional view of the electrical connector system in accordance with an exemplary embodiment showing the plug connector in an unmated state.
Figure 11:
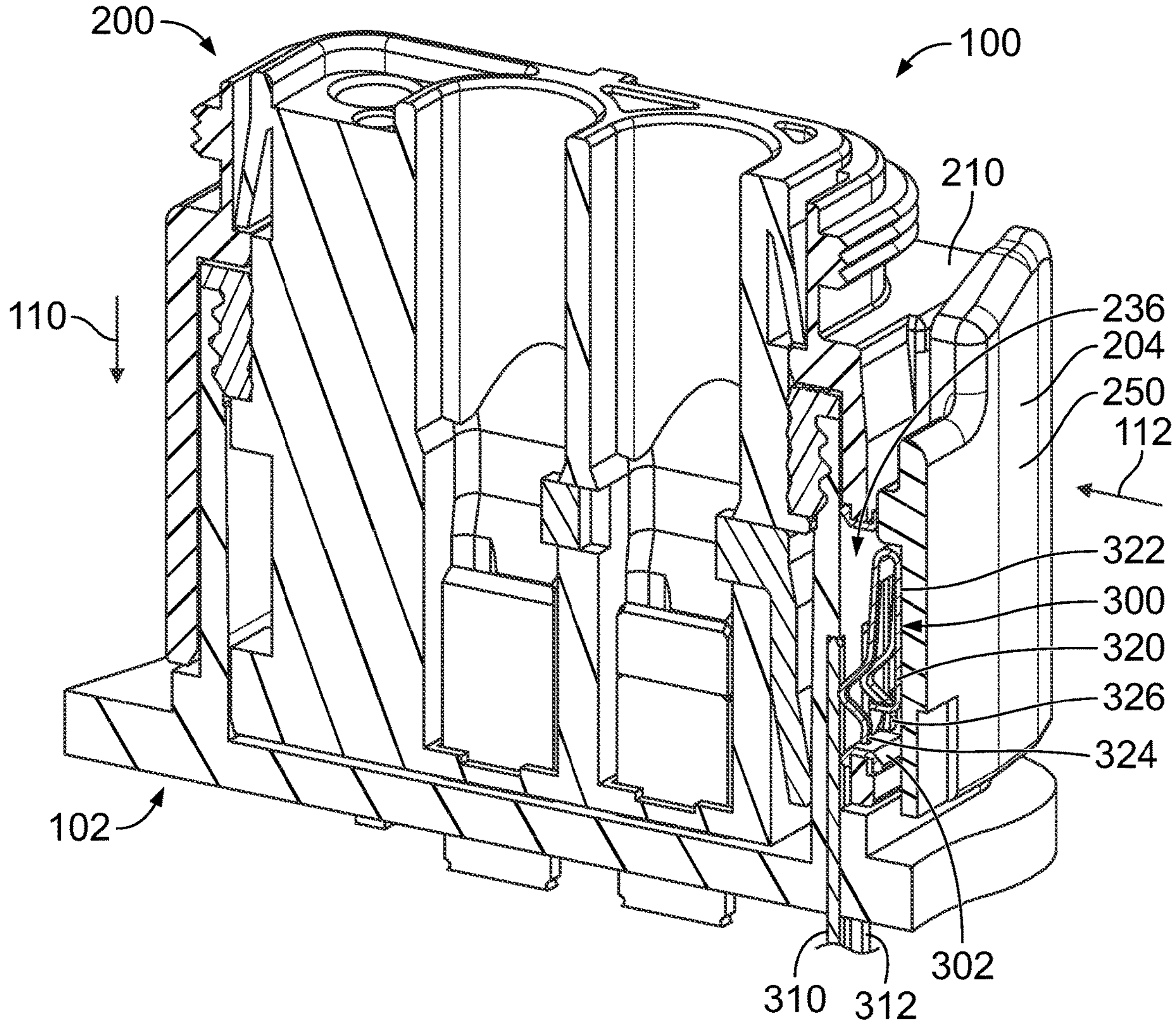
FIG. 11 is a cross-sectional view of the electrical connector system in accordance with an exemplary embodiment showing the plug connector in a mated state.

FIG. 10 is a cross-sectional view of the electrical connector system 100 in accordance with an exemplary embodiment showing the plug connector 200 in an unmated state. FIG. 11 is a cross-sectional view of the electrical connector system 100 in accordance with an exemplary embodiment showing the plug connector 200 in a mated state. FIGS. 10 and 11 show the fixed terminals 310, 312 along the exterior of the shroud 124 as shown in FIG. 9. In the illustrated embodiment, the seal 302 of the assembly 300 is coupled to the plug housing 210 at the opening 236.

In an exemplary embodiment, the shorting terminal 320 is coupled to the actuator 204. For example, the shorting terminal 320 may be coupled to an interior surface of the lever 250 of the actuator 204. The main body 322 of the shorting terminal 320 extends along the lever 250 and the mating arms 324, 326 extend from the main body 322 toward the plug housing 210.

During mating, the plug connector 200 is moved downward in the mating direction 110 relative to the header connector 102. As the plug housing 210 is moved downward to the mated position, the opening 236 is configured to be aligned with the fixed terminals 310, 312. When the plug connector is in the mated position, the actuator 204 is moved in the actuation direction 112 to the closed position to move the shorting terminal 320 toward the fixed terminals 310, 312. When the actuator 204 is moved to the closed position, the mating arms 324, 326 engage the fixed terminals 310, 312 to close the position assurance circuit. The assembly 300 provides an electrical guarantee that the plug connector 200 is fully mated with the header connector 102. For example, the plug connector 200 can only be unmated from the header connector 102 after the actuator 204 is moved to the open position, thus opening the position assurance circuit.

Figure 12:
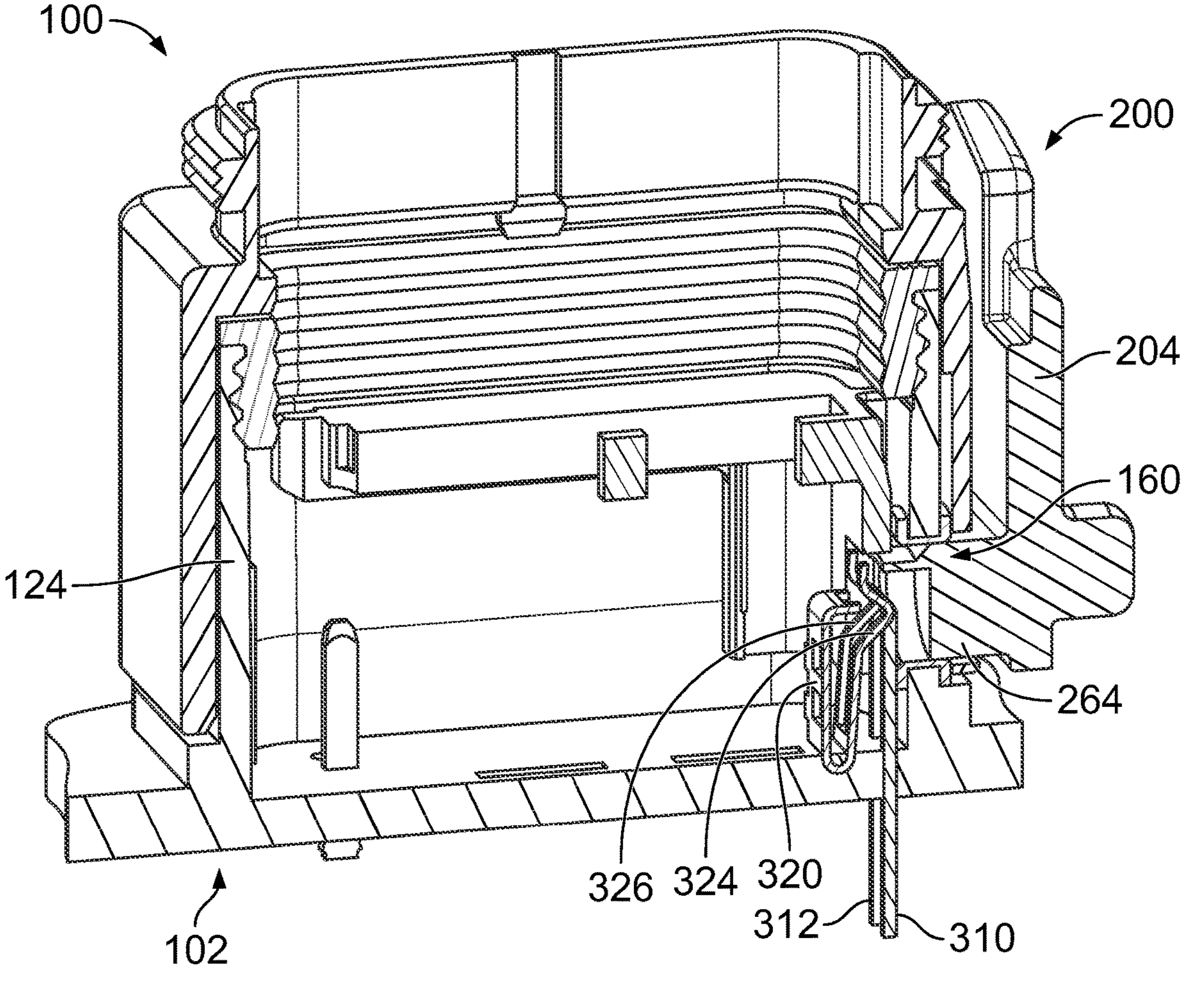
FIG. 12 is a cross-sectional view of the electrical connector system in accordance with an exemplary embodiment showing the plug connector in an unmated state.
Figure 13:
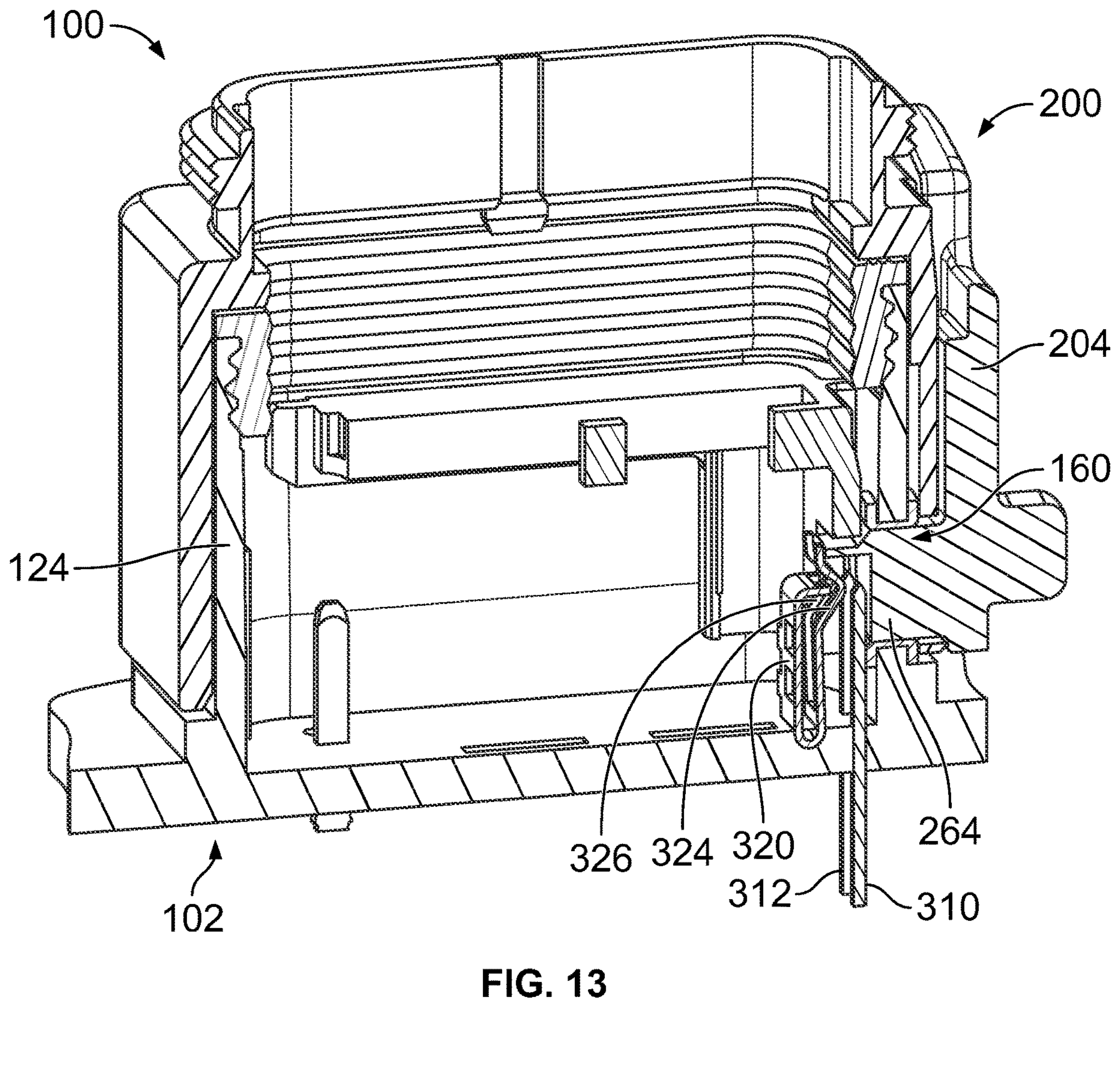
FIG. 13 is a cross-sectional view of the electrical connector system in accordance with an exemplary embodiment showing the plug connector in a mated state.

FIG. 12 is a cross-sectional view of the electrical connector system 100 in accordance with an exemplary embodiment showing the plug connector 200 in an unmated state. FIG. 13 is a cross-sectional view of the electrical connector system 100 in accordance with an exemplary embodiment showing the plug connector 200 in a mated state. FIGS. 12 and 13 show the fixed terminals 310, 312 along the interior of the shroud 124. FIGS. 12 and 13 show the shorting terminal 320 held within the interior of the shroud 124 rather than being held by the actuator 204. The shorting terminal 320 may be fixed relative to the header connector 102. The actuator 204 is movable relative to the shorting terminal 320 and is configured to engage and unmate the shorting terminal 320 from the fixed terminals 310, 312.

In an exemplary embodiment, the shorting terminal 320 is configured to be normally closed. For example, the shorting terminal 320 is normally mated with the fixed terminals 310, 312 in a resting position (FIG. 12) to close or make the position assurance circuit. However, when the actuator 204 is closed (FIG. 13), the protrusion 264 passes through the opening 160 to interface with the shorting terminal 320. The protrusion 264 pushes the mating arms 324, 326 away from the fixed terminals 310, 312 to disengage the shorting terminal 320 from the fixed terminals 310, 312 and open the position assurance circuit. The assembly 300 provides an electrical guarantee that the plug connector 200 is fully mated with the header connector 102. For example, the plug connector 200 can only be unmated from the header connector 102 after the actuator 204 is moved to the open position, thus closing the position assurance circuit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A plug connector comprising:

a plug housing having an outer wall extending between a front and a rear of the plug housing, the outer wall forming a cavity, the plug housing configured to be coupled to a header connector, the plug housing including contact channels;

plug contacts received in corresponding contact channels, the plug contacts configured to be mated with corresponding header contacts of the header connector;

an actuator coupled to the plug housing, the actuator movable relative to the plug housing between an open position and a closed position, the actuator configured to engage the header connector to provide mechanical mating assist of the plug connector with the header connector as the actuator is moved from the open position to the closed position, wherein the actuator is slidably coupled to the plug housing; and an electrical connector position assurance (eCPA) assembly including a shorting terminal operably coupled to the actuator and movable by the actuator between a mated position and an unmated position, the shorting terminal including a first interface configured to be coupled to a first fixed terminal in the mated position and a second interface configured to be coupled to a second fixed terminal in the mated position, the shorting terminal forming a position assurance circuit in the mated position when the first and second interfaces are coupled to the first and second fixed terminals.

2. The plug connector of claim 1, wherein the shorting terminal is coupled to and movable with the actuator.

3. The plug connector of claim 1, wherein the shorting terminal is in the unmated position when the actuator is in the open position and wherein the shorting terminal is in the mated position when the actuator is in the closed position.

4. The plug connector of claim 1, wherein the shorting terminal includes a base, a first arm extending from the base to a first end, and a second arm extending from the base to a second end, the first end defining the first interface, the second end defining the second interface.

5. The plug connector of claim 1, wherein the eCPA assembly includes a seal providing sealing around the shorting terminal.

6. The plug connector of claim 5, wherein the seal is sealingly coupled to the actuator.

7. The plug connector of claim 6, wherein the actuator includes a protrusion, the shorting terminal being held in a pocket of the protrusion, the seal interfacing with an exterior of the protrusion.

8. The plug connector of claim 5, wherein the seal is sealingly coupled to the outer wall of the plug housing.

9. The plug connector of claim 5, wherein the seal is configured to be sealingly coupled to a header housing of the header connector.

10. The plug connector of claim 1, wherein the actuator is movable in an actuation direction, the actuator moving the plug housing in a mating direction perpendicular to the actuation direction.

11. The plug connector of claim 1, wherein the shorting terminal is separate from the actuator, the actuator movable relative to the shorting terminal as the actuator moves from the open position to the closed position, the actuator engaging the shorting terminal in the closed position to move the shorting terminal from the mated position to the unmated position to open the position assurance circuit when the actuator is in the closed position.

12. A plug connector comprising:

a plug housing having an outer wall extending between a front and a rear of the plug housing, the outer wall forming a cavity, the plug housing configured to be coupled to a header connector, the plug housing including contact channels;

plug contacts received in corresponding contact channels, the plug contacts configured to be mated with corresponding header contacts of the header connector;

an actuator coupled to the plug housing, the actuator movable relative to the plug housing between an open position and a closed position, the actuator configured to engage the header connector to provide mechanical mating assist of the plug connector with the header connector as the actuator is moved from the open position to the closed position; and an electrical connector position assurance (eCPA) assembly including a shorting terminal operably coupled to the actuator and movable by the actuator between a mated position and an unmated position, the shorting terminal including a first interface configured to be coupled to a first fixed terminal in the mated position and a second interface configured to be coupled to a second fixed terminal in the mated position, the shorting terminal forming a position assurance circuit in the mated position when the first and second interfaces are coupled to the first and second fixed terminals;

wherein the shorting terminal is separate from the actuator, the actuator movable relative to the shorting terminal as the actuator moves from the open position to the closed position, the actuator engaging the shorting terminal in the closed position to move the shorting terminal from the mated position to the unmated position to open the position assurance circuit when the actuator is in the closed position.

13. The plug connector of claim 12, wherein the actuator is slidably coupled to the plug housing.

14. The plug connector of claim 12, wherein the eCPA assembly includes a seal providing sealing around the shorting terminal.

15. A plug connector comprising:

a plug housing having an outer wall extending between a front and a rear of the plug housing, the outer wall forming a cavity, the plug housing configured to be coupled to a header connector, the plug housing including contact channels;

plug contacts received in corresponding contact channels, the plug contacts configured to be mated with corresponding header contacts of the header connector;

an actuator coupled to the plug housing, the actuator movable relative to the plug housing between an open position and a closed position, the actuator configured to engage the header connector to provide mechanical mating assist of the plug connector with the header connector as the actuator is moved from the open position to the closed position; and an electrical connector position assurance (eCPA) assembly including a seal and a shorting terminal, the shorting terminal operably coupled to the actuator and movable by the actuator between a mated position and an unmated position, the shorting terminal including a first interface configured to be coupled to a first fixed terminal in the mated position and a second interface configured to be coupled to a second fixed terminal in the mated position, the shorting terminal forming a position assurance circuit when the first and second interfaces are coupled to the first and second fixed terminals, the eCPA seal providing sealing around the shorting terminal.

16. The plug connector of claim 15, wherein the seal is sealingly coupled to at least one of the actuator and the outer wall of the plug housing, and wherein the seal is configured to be sealingly coupled to a header housing of the header connector.

17. The plug connector of claim 15, wherein the shorting terminal is separate from the actuator, the actuator movable relative to the shorting terminal as the actuator moves from the open position to the closed position, the actuator engaging the shorting terminal in the closed position to move the shorting terminal from the mated position to the unmated position to open the position assurance circuit when the actuator is in the closed position.

18. The plug connector of claim 15, wherein the actuator is slidably coupled to the plug housing.

19. An electrical connector system comprising:

a header connector including a header housing and header contacts held by the header housing, the header housing having a base and a shroud extending from the base, the shroud surrounding a shroud chamber, the header contacts coupled to the base and extending into the shroud chamber;

a plug connector including a plug housing holding plug contacts, the plug housing having an outer wall forming a cavity, the outer wall being coupled to the shroud of the header connector, the plug contacts extending into the cavity and being plugged into the shroud chamber of the header connector for mating with the corresponding header contacts of the header connector, the plug connector including an actuator coupled to the plug housing and movable relative to the plug housing between an open position and a closed position, the actuator engaging the header connector to provide mechanical mating assist of the plug connector with the header connector as the actuator is moved from the open position to the closed position; and an electrical connector position assurance (eCPA) assembly operably coupled to the header connector and the plug connector, the eCPA including a first fixed terminal coupled to the header housing and a second fixed terminal coupled to the header housing, the eCPA including a shorting terminal operably coupled to the actuator and movable by the actuator between a mated position and an unmated position, the shorting terminal including a first interface configured to be coupled to a first fixed terminal in the mated position and a second interface configured to be coupled to a second fixed terminal in the mated position, the shorting terminal forming a position assurance circuit in the mated position when the first and second interfaces are coupled to the first and second fixed terminals, wherein the eCPA assembly includes a seal providing sealing around the shorting terminal.

20. The electrical connector system of claim 19, wherein the seal is sealingly coupled to at least one of the actuator and the outer wall of the plug housing, and wherein the seal is configured to be sealingly coupled to a header housing of the header connector.

21. The electrical connector system of claim 19, wherein the first and second fixed terminals extend along an exterior of the shroud, the plug housing having an opening providing access to the first and second fixed terminals, the shorting terminal passing through the opening to interface with the first and second fixed terminals, wherein the seal surrounds the opening to seal around the shorting terminal.

22. The electrical connector system of claim 19, wherein the first and second fixed terminals extend into the shroud chamber, the shroud including an opening, the shorting terminal being loaded through the opening into the shroud chamber to interface with the first and second fixed terminals, wherein the seal surrounds the opening to seal around the shorting terminal.

23. The electrical connector system of claim 19, wherein the shorting terminal is separate from the actuator, the actuator movable relative to the shorting terminal as the actuator moves from the open position to the closed position, the actuator engaging the shorting terminal in the closed position to move the shorting terminal from the mated position to the unmated position to open the position assurance circuit when the actuator is in the closed position.

24. The electrical connector system of claim 19, wherein the actuator is slidably coupled to the plug housing.

* * * * *